Patented Dec. 29, 1936

2,066,280

UNITED STATES PATENT OFFICE 2,066,280

SATURATED-BRANCHED-CHAIN-PRIMARY-ALKYL ETHYL BARBITURIC COMPOUND

Horace A. Shonle, Indianapolis, Ind., assignor to Eli Lilly and Company, Indianapolis, Ind., a corporation of Indiana No Drawing. Application January 29, 1934, Serial No. 708,906

14 Claims. (Cl. 260—33)

It is the main object of my invention to produce certain 5,5-di-alkyl-substituted barbituric acids, and their salts, in which one substituent is the ethyl group, and the other substituent is a saturated branched-chain primary-alkyl radical having a straight chain containing 5, 6, or 7 carbon atoms with a methyl substituent on either or both of the number 2 and number 4 carbon atoms. The second substituent may thus be any of the following:

Substituted-pentyl groups:

a. 2-methyl-pentyl;

$$CH_3-CH_2-CH_2-\underset{\underset{CH_3}{|}}{CH}-CH_2-$$

b. 4-methyl-pentyl;

$$CH_3-\underset{\underset{CH_3}{|}}{CH}-CH_2-CH_2-CH_2-$$

c. 2,4-dimethyl-pentyl;

$$CH_3-\underset{\underset{CH_3}{|}}{CH}-CH_2-\underset{\underset{CH_3}{|}}{CH}-CH_2-$$

Substituted-hexyl groups:

d. 2-methyl-hexyl;

$$CH_3-CH_2-CH_2-CH_2-\underset{\underset{CH_3}{|}}{CH}-CH_2-$$

e. 4-methyl-hexyl;

$$CH_3-CH_2-\underset{\underset{CH_3}{|}}{CH}-CH_2-CH_2-CH_2-$$

f. 2,4-dimethyl-hexyl;

$$CH_3-CH_2-\underset{\underset{CH_3}{|}}{CH}-CH_2-\underset{\underset{CH_3}{|}}{CH}-CH_2-$$

Substituted-heptyl groups:

g. 2-methyl-heptyl;

$$CH_3-CH_2-CH_2-CH_2-CH_2-\underset{\underset{CH_3}{|}}{CH}-CH_2-$$

h. 4-methyl-heptyl;

$$CH_3-CH_2-CH_2-\underset{\underset{CH_3}{|}}{CH}-CH_2-CH_2-CH_2-$$

i. 2,4-dimethyl-heptyl;

$$CH_3-CH_2-CH_2-\underset{\underset{CH_3}{|}}{CH}-CH_2-\underset{\underset{CH_3}{|}}{CH}-CH_2-$$

Of these groups, a and b are primary-hexyl groups, c, d, and e are primary-heptyl groups, f, g, and h are primary octyl groups, and i is a primary nonyl group.

An incidental object of my invention is to produce certain new intermediates. These are di-alkyl-substituted malonic esters, The new 5,5-di-alkyl-substituted barbituric acids and their salts which are included in this present application all have hypnotic action. They are all represented by the following formula:

(1)

$$\underset{CH_3-CH_2}{\overset{R}{\diagdown}}C\underset{CO-N-X}{\overset{CO-NH}{\diagup}}CO$$

in which R represents a saturated branched-chain primary-alkyl radical having a straight chain containing 5, 6, or 7 carbon atoms with a methyl substituent on either or both of the number 2 and number 4 carbon atoms; and X represents either hydrogen (if the compound is an acid), or (if the compound is a salt) either an alkali metal, such as sodium, or ammonium, or a mono- or di-alkyl ammonium, such as —NH$_3$—CH$_3$ or —NH$_2$(C$_2$H$_5$)$_2$.

These new acids and salts are prepared from certain new di-substituted malonic esters, usually ethyl esters, which are represented by the following formula:

(2)

$$\underset{CH_3-CH_2}{\overset{R}{\diagdown}}C\underset{CO-OR'}{\overset{CO-OR'}{\diagup}}$$

in which R, as before, represents a saturated branched-chain primary-alkyl radical having a straight chain containing 5, 6, or 7 carbon atoms with a methyl substituent on either or both of the number 2 and number 4 carbon atoms; and R' represents an alkyl radical having not to exceed 3 carbon atoms, namely the methyl, ethyl, and propyl radicals, and preferably the ethyl radical. Because of this preference, in making these substituted malonic esters I prefer to work with the di-ethyl malonates; and so whenever I refer to a malonic ester, substituted or unsubstituted, I mean the di-ethyl malonate unless otherwise indicated.

In describing the various examples illustrative of my invention, I shall describe first the malonic esters, then the barbituric acids, and then the barbiturates; and the procedures for respectively producing them.

Malonic esters

In making the respective malonic esters, I use saturated branched-chain primary-alkyl alcohols having a straight chain containing 5, 6, or 7 carbon atoms with a methyl substituent on either or both of the number 2 and number 4 carbon atoms. Examples of these are the following:

2-methyl-pentanol-1
4-methyl-pentanol-1
2,4-dimethyl-pentanol-1
2,4-dimethyl-hexanol-1
4-methyl-heptanol-1

These alcohols are not my invention, but are already known, and are obtainable from technical sources. There is difficulty in getting these alcohols free from other alcohols. Each of the first two named is especially likely to contain more or less of the other of those two, because their boiling points are nearly the same. But even though these alcohols contain some other alcohol or alcohols, they can be used in my procedure; and although the resultant bromides, malonic esters, barbituric acids, and barbiturates will be corresponding mixtures, they still have the physical, chemical, and physiological properties as indicated below.

In using these alcohols to make the malonic esters, I proceed as follows:

First I obtain the corresponding bromide from the alcohol. This may be done by treating the respective alcohol (or alcohol-mixture) with $PBr_3$, in the manner described for certain other alcohols by Hsueh and Marvel, Journal of American Chemical Society, Volume 50, p. 855, 1928.

For the five alcohols named as examples, this treatment produces the corresponding bromides. Among the bromide fractions which I have used are the following:

1-bromo-2-methyl-pentane, which at about 23–25 mm. pressure boils at 47°–51° C.;
1-bromo-4-methyl-pentane, which at about 29 mm. pressure boils at 55°–60° C.;
1-bromo-2,4-dimethyl-pentane, which at about 27–28 mm. pressure boils at 65°–66° C.;
1-bromo-2,4-dimethyl-hexane, which at about 20–21 mm. pressure boils at 75°–80° C.;
1-bromo-4-methyl-heptane, which at about 20 mm. pressure boils at 77°–82° C.

One mole of sodium is dissolved in from 10 to 12 times its weight of absolute alcohol, under a reflux condenser. One mole of ethyl malonic ester (ethyl di-ethyl-malonate) is then added. Desirably most of the alcohol that was used to dissolve the sodium is then removed, as by vacuum distillation. Then about 1.1 moles of the respective bromide, produced as above described, is gradually added. The mixture is refluxed for some hours, until it no longer shows an alkaline reaction to moist litmus. Most of the alcohol remaining, whether or not some had previously been removed, is now removed by vacuum distillation, leaving an oily residue. Water is added to this residue to dissolve out the sodium bromide present in it; and the oily layer, which is the desired di-substituted malonic ester, is separated and dried. This di-substituted malonic ester is purified by fractional distillation in vacuo. When so purified it is a colorless or pale yellow liquid in all the cases named.

The malonic esters which are obtained from the alcohols given as examples, and from the bromides derived from those alcohols, are the following:

*2-methyl-pentyl ethyl malonic ester*

This had a boiling point of 103°–105° C., corrected, at about 2 mm. pressure; and is represented by the following formula:

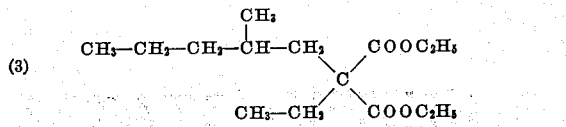

*4-methyl-pentyl ethyl malonic ester*

This had a boiling point of approximately 106°–109° C., corrected, at about 2 mm. pressure; and is represented by the following formula:

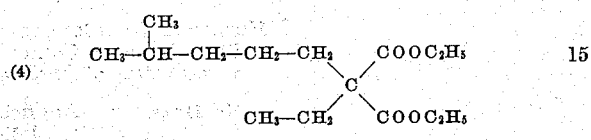

*2,4-dimethyl-pentyl ethyl malonic ester*

This had a boiling point of 135°–141° C., corrected, at 8–10 mm. pressure; and is represented by the following formula:

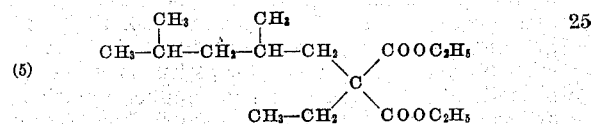

*2,4-dimethyl-hexyl ethyl malonic ester*

This has a boiling point of about 108°–112° C., corrected, at about 1–2 mm. pressure; and is represented by the following formula:

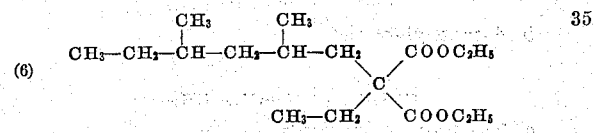

*4-methyl-heptyl ethyl malonic ester*

This has a boiling point of about 115°–122° C., corrected, at about 1–2 mm. pressure; and is represented by the following formula:

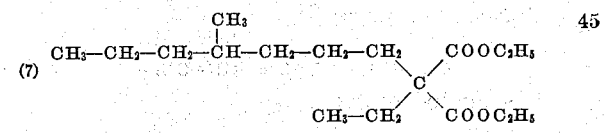

*Barbituric acids*

Di-substituted barbituric acids corresponding to the various di-substituted malonic esters above described may be obtained. These barbituric acids are represented by the following general formula:

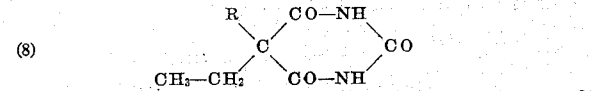

in which R has the same significance as before.

In general, the method of preparing such di-substituted barbituric acids is as follows:

Three moles of sodium are dissolved in 10 to 12 times its weight of absolute alcohol under a reflux condenser. To this are added about 1.6 moles of urea and 1 mole of the di-substituted malonic ester of which the corresponding barbituric acid is desired. The mixture is gently refluxed for 12 to 15 hours, after which most of the alcohol is removed by vacuum distillation. The residue is dissolved in water, and a sufficient amount of a dilute acid, such as hydrochloric acid, is added to completely throw out of solution the di-substituted barbituric acid which has been formed. This di-substituted barbituric acid comes out of solution in some cases as a solid, and in some cases as an oily liquid which solidifies on standing. The di-substituted barbituric acid so obtained is separated, as by filtration; is then dried, and washed with gasoline; and is then purified by recrystallization, either from dilute alcohol or from a mixture of acetone and petroleum ether. The barbituric acids thus obtained are all white solids, generally crystalline; are insoluble in water, and readily soluble in alcohol and ether; are bitter-tasting; and have hypnotic action.

The di-substituted barbituric acids which are obtained from the malonic esters given as examples are the following:

2-methyl-pentyl ethyl barbituric acid

This has a melting point, after a single recrystallization from dilute alcohol, of 136°–138° C.; and after repeated recrystallization from dilute alcohol, of 149°–151° C., corrected. It is represented by the following formula:

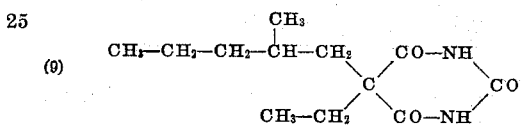

4-methyl-pentyl ethyl barbituric acid

This has a melting point, after a single recrystallization from dilute alcohol, of 111°–119° C.; and after repeated recrystallization from dilute alcohol, of 108°–110° C., corrected. It is represented by the following formula:

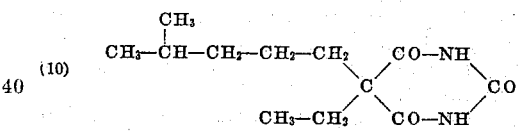

2,4-dimethyl-pentyl ethyl barbituric acid

This has a melting point, after repeated recrystallization from dilute alcohol, of 124°–126° C., corrected, and is represented by the following formula:

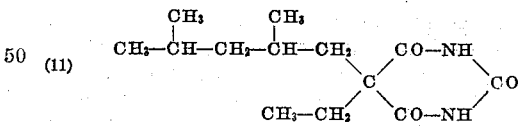

2,4-dimethyl-hexyl ethyl barbituric acid

This may separate as an oily semi-solid, which changes to a wax-like solid on standing. After washing with gasoline, and recrystallizing from a mixture of acetone and petroleum ether, it is obtained in a crystalline form; in which it has a rather widely varying melting point, depending upon the degree of purification obtained, which has usually been between 105° and 115° C. This di-substituted barbituric acid is represented by the following formula:

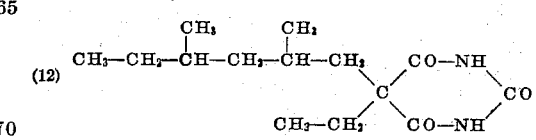

4-methyl-heptyl ethyl barbituric acid

This separates as an oily semi-solid, which changes to a wax-like solid on standing. After washing with gasoline, and recrystallizing from a mixture of acetone and petroleum ether, it is obtained in solid form, which has a melting point of 77°–80° C., corrected. It is represented by the following formula:

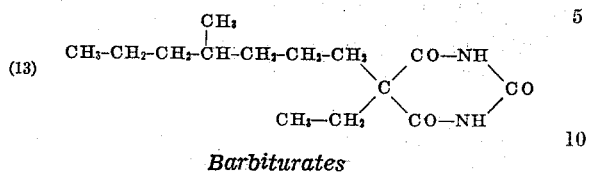

Barbiturates

All of the above-described barbituric acids are soluble in solutions of alkali-metal hydroxides and ethylates, to form the corresponding alkali-metal barbiturates in solution. The solid salts may be obtained from such solutions.

The new di-alkyl-substituted barbiturates, which may all be represented by Formula 1 with X representing a metal or ammonium or a mono- or di-alkyl ammonium, can perhaps best be prepared from the corresponding di-aliphatic-substituted barbituric acids, as by reaction in a suitable solvent with either the hydroxide or the ethylate of the desired inorganic base, or with ammonia, or with the desired alkyl amine. For instance:

*A. Alkali-metal salts.*—The sodium salts of these di-substituted barbituric acids are all represented by the following general formula:

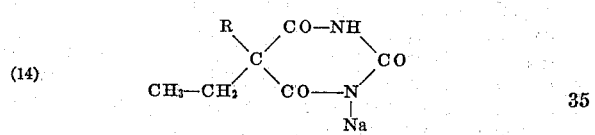

in which R has the same significance as before. The other alkali-metal salts have the same general formula, except for the substitution of the other metal for sodium. These salts are prepared as follows:

A solution of one molar proportion of the hydroxide or the ethylate of the alkali metal, such as sodium, is added to a suspension or solution in a suitable solvent (such as alcohol) of one molar proportion of any of the herein-contemplated 5,5-di-alkyl-substituted barbituric acids; which produces the desired barbiturate in solution. The amount of solvent used is desirably sufficient to dissolve the salt thus produced. The solution is filtered; and is then evaporated, preferably under vacuum at a low temperature, until the salt is obtained in solid form. The sodium salts of the various di-substituted barbituric acids given as examples are the following:

Sodium 2-methyl-pentyl ethyl barbiturate which has the following formula:

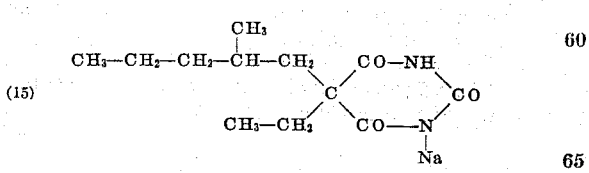

Sodium 4-methyl-pentyl ethyl barbiturate which has the following formula:

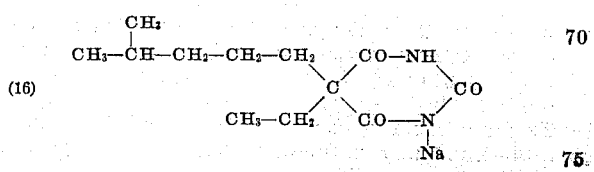

Sodium 2,4-dimethyl-pentyl ethyl barbiturate which has the following formula:

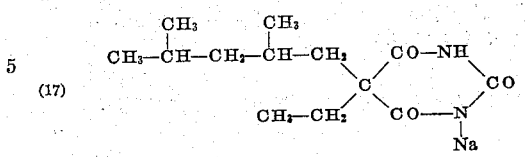
(17)

Sodium 2,4-dimethyl-hexyl ethyl barbiturate which has the following formula:

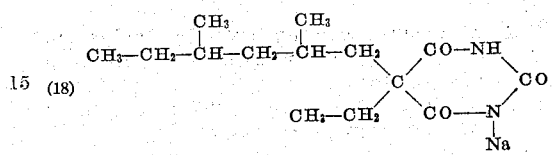
(18)

Sodium 4-methyl-heptyl ethyl barbiturate which has the following formula:

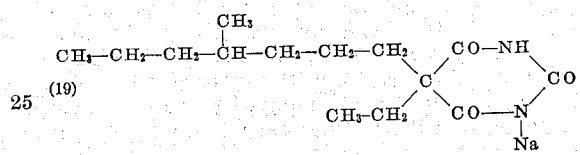
(19)

These sodium salts are all white solids, soluble in water and alcohol, and insoluble in ether. They are all bitter-tasting, and their aqueous solutions are alkaline in reaction. They are all excellent hypnotics, when administered either orally or hypodermically. When these salts are desired in stable form sufficiently free from contaminants so that clear water solutions thereof suitable for intravenous injection may be obtained, they may be so obtained by the method set forth in my Patent No. 1,856,792, granted May 3, 1932.

B. *Ammonium and alkyl-amine salts.*—One molar proportion of any of the above-described 5,5-di-aliphatic-substituted barbituric acids is dissolved in or added to somewhat more than a molar proportion of an aqueous or alcoholic solution of concentrated ammonia or of the alkyl-amine, such for instance as mono- or di-methyl amine or mono- or di-ethyl amine. The amount of liquid should be sufficient to ensure complete reaction. The resulting barbiturate crystallizes out or is concentrated to solid form. The formulas of these barbiturates correspond in general to formulas 15 to 19 inclusive, save that NH4 is substituted for Na in the case of the ammonium salts, or the proper substituted-ammonium radical, such for instance as the methyl-ammonium-radical (—NH3CH3), is substituted for Na in the case of the alkyl-amine salts.

The above-described di-alkyl substituted barbituric acids and their salts are all of value as sedatives and hypnotics.

I claim as my invention:

1. A barbituric compound which is represented by the following formula:

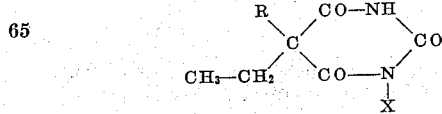

in which R represents a saturated branched-chain primary-alkyl radical having a straight chain containing 5 to 7 carbon atoms with a methyl substituent on at least one of the number 2 and number 4 carbon atoms; and X represents a member of the class consisting of hydrogen, an alkali metal, ammonium, mono-alkyl ammonium, and di-alkyl ammonium.

2. A barbituric acid which is represented by the following formula:

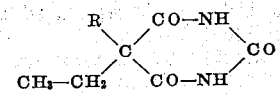

in which R represents a saturated branched-chain primary-alkyl radical having a straight chain containing 5 to 7 carbon atoms with a methyl substituent on at least one of the number 2 and number 4 carbon atoms.

3. A barbituric compound which is represented by the following formula:

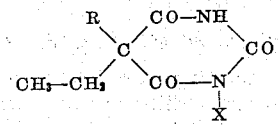

in which R represents a saturated branched-chain primary-hexyl radical having a straight chain containing 5 carbon atoms with a methyl substituent on one of the number 2 and number 4 carbon atoms; and X represents a member of the class consisting of hydrogen, an alkali metal, ammonium, mono-alkyl ammonium, and di-alkyl ammonium.

4. A barbituric acid which is represented by the following formula:

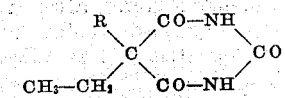

in which R represents a saturated branched-chain primary-hexyl radical having a straight chain containing 5 carbon atoms with a methyl substituent on one of the number 2 and number 4 carbon atoms.

5. A barbituric compound which is represented by the following formula:

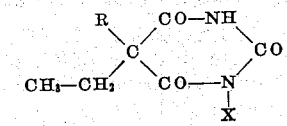

in which R represents a saturated branched-chain primary-heptyl radical having a straight chain containing at least 5 carbon atoms with a methyl substituent on at least one of the number 2 and number 4 carbon atoms; and X represents a member of the class consisting of hydrogen, an alkali metal, ammonium, mono-alkyl ammonium, and di-alkyl ammonium.

6. A barbituric acid which is represented by the following formula:

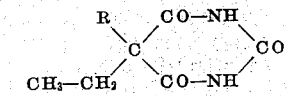

in which R represents a saturated branched-chain primary-heptyl radical having a straight chain containing at least 5 carbon atoms with a methyl substituent on at least one of the number 2 and number 4 carbon atoms.

7. A barbituric compound which is represented by the following formula:

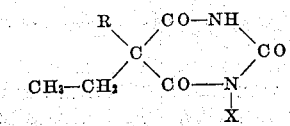

in which R represents a saturated branched-chain primary-octyl radical having a straight chain containing at least 6 carbon atoms with a methyl substituent on at least one of the number 2 and number 4 carbon atoms; and X represents a member of the class consisting of hydrogen, an alkali metal, ammonium, mono-alkyl ammonium and di-alkyl ammonium.

8. A barbituric acid which is represented by the following formula:

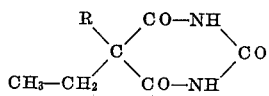

in which R represents a saturated branched-chain primary-octyl radical having a straight chain containing at least 6 carbon atoms with a methyl substituent on at least one of the number 2 and number 4 carbon atoms.

9. A 2-methyl-pentyl ethyl barbituric compound which is represented by the following formula:

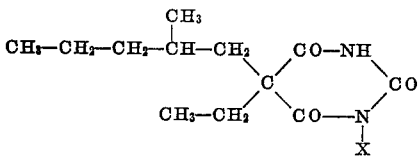

in which X represents a member of the class consisting of hydrogen, an alkali metal, ammonium, mono-alkyl ammonium, and di-alkyl ammonium.

10. 2-methyl-pentyl ethyl barbituric acid, which is represented by the following formula:

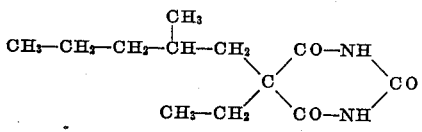

11. A 2,4-di-methyl-pentyl ethyl barbituric compound which is represented by the following formula:

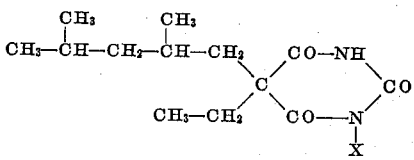

in which X represents a member of the class consisting of hydrogen, an alkali metal, ammonium, mono-alkyl ammonium, and di-alkyl ammonium.

12. 2,4-di-methyl-pentyl ethyl barbituric acid, which is represented by the following formula:

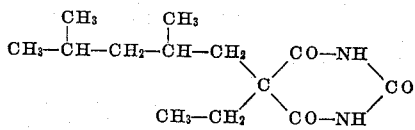

13. A 2,4-di-methyl-hexyl ethyl barbituric compound which is represented by the following formula:

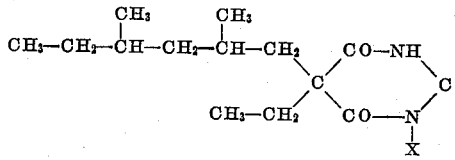

in which X represents a member of the class consisting of hydrogen, an alkali metal, ammonium, mono-alkyl ammonium and di-alkyl ammonium.

14. 2,4-di-methyl-hexyl ethyl barbituric acid, which is represented by the following formula:

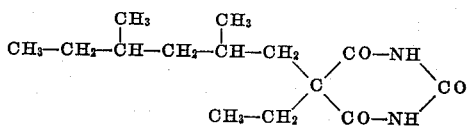

HORACE A. SHONLE.